United States Patent [19]
Desai

[11] Patent Number: 5,293,297
[45] Date of Patent: Mar. 8, 1994

[54] THERMALLY REGULATED SAFETY DEVICE FOR PORTABLE ENERGY UNITS

[75] Inventor: Venus D. Desai, Plantation, Fla.

[73] Assignee: Motorola, Inc., Schaumburg, Ill.

[21] Appl. No.: 814,647

[22] Filed: Dec. 30, 1991

[51] Int. Cl.$^5$ ............................................. H02H 5/04
[52] U.S. Cl. ............................................... 361/106
[58] Field of Search ............................................ 361/106

[56] References Cited

U.S. PATENT DOCUMENTS 3,686,530  8/1972  Bogut .
4,413,301  11/1983 Middleman et al. .
4,638,396  1/1987  Mukli et al. .
4,780,598  10/1988 Fahey et al. .

OTHER PUBLICATIONS

Data Sheet H52948 on the "Strap & Disk Family" by Raychem Corp., Nov. 1988.
Brochure H52910, "Polyswitch Devices" by Raychem Corp., Jan. 1987.

*Primary Examiner*—A. D. Pellinen
*Assistant Examiner*—Ronald William Leja
*Attorney, Agent, or Firm*—Juliana Agon

[57] ABSTRACT

An improved circuit protection device (30) comprises a PTC element (10), at least two electrodes (2 and 3) connectable to a source of electrical power (12) so that current passes between the electrodes (2 and 3) through the PTC element (10), and at least one nichrome electrical lead (122, 123) which electrically connects one of the electrodes (2, 3) to the source of electrical power (12).

10 Claims, 2 Drawing Sheets

THERMALLY REGULATED SAFETY DEVICE FOR PORTABLE ENERGY UNITS

TECHNICAL FIELD

This invention relates generally to overload protection circuits but more particularly to a battery protection circuit for portable radios used in hazardous environments.

BACKGROUND

Overload protection devices such as current limiters and positive temperature coefficient (PTC) conductive polymers, commonly called a PolySwitch ® registered to Raychem and described in the U.S. Pat. No. 4,780,598, assigned to Raychem, and hereby incorporated by reference are usually used together as seen in FIG. 1, especially in a hazardous environment. Hazardous environments are occasions in which the atmosphere contains gas vapor or dust particles which could easily be ignited by sparks or thermal heating.

Individually, a PTC element has a relatively low resistance under the normal operating conditions for the circuit, but is "tripped", (i.e. converted into a high resistance state), when a fault condition such as an excessive current (short circuit) or temperature occurs. When the circuit protection device 29 comprising the PTC conductive polymers 10 is tripped, the current passing through the series connected PTC element 10 causes it to self-heat to an elevated temperature at which it is in a high resistance state. However, the leads 13 of the PTC circuit protection device 29 are usually made out of nickel, which does not provide enough resistance to limit the current through the battery 12 before the PTC element 10 increases its resistance to further limit the current and substantially provides an open circuit.

Individually, a current limiter 15 is, conventionally, a fixed resistor of some particular height, (such as a fixed series resistor which is a wire-wound or a nichrome strip or any other kind of a nichrome assembly as described in the H52910 Raychem sales brochure for the "Protection of Batteries with PolySwitch ® Devices and hereby incorporated by reference) to provide a high enough resistance to limit the current. However, the current limiter, such as the commonly used nichrome strip, generally, allows a percentage of the maximum short circuit current to still flow under fault conditions, which may deliver enough energy to cause the fixed nichrome resistor or strip to overheat and cause ignition of the explosive atmosphere. Thus a PTC element is usually used in combination with the nichrome strip to prevent this occurrence as seen in FIG. 1 of an intrinsically safe battery pack.

However, the combination of both the nichrome strip and the PTC element increases both the size and the cost to the protection circuit that must be built inside the battery housing.

SUMMARY OF THE INVENTION

Briefly, according to the invention, an improved circuit protection device comprises a PTC element, at least two electrodes connectable to a source of electrical power so that current passes between the electrodes through the PTC element, and at least one nichrome electrical lead, or any lead made from other suitably resistive material, which electrically connects one of the electrodes to the source of electrical power.

DETAILED DESCRIPTION OF THE PREFERRED EMBODIMENT

Figure 1:
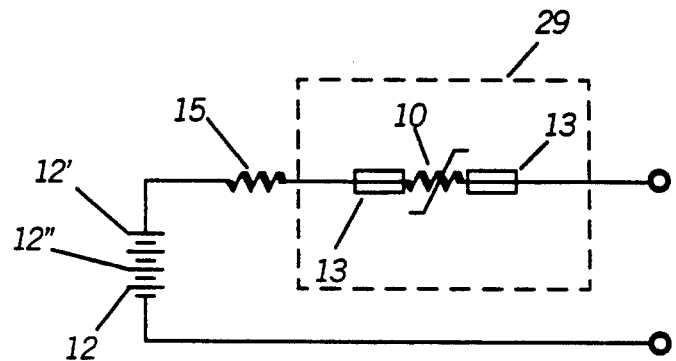
FIG. 1 is an intrinsically safe battery pack showing the prior art teaching.
Figure 4:
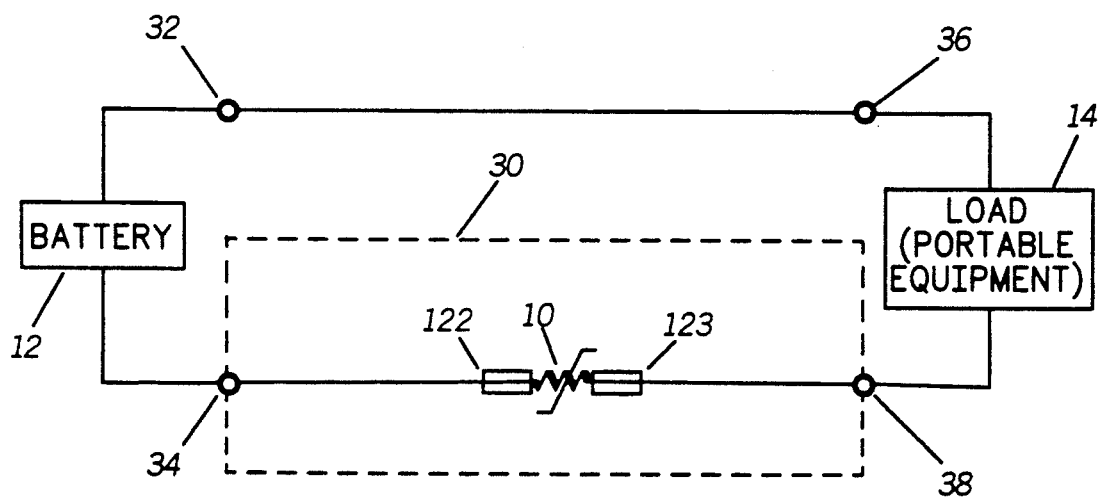
FIG. 4 is partial block diagram and schematic representation of the improved PTC circuit protection device of FIG. 2 in a battery protection circuit.
Figure 2:
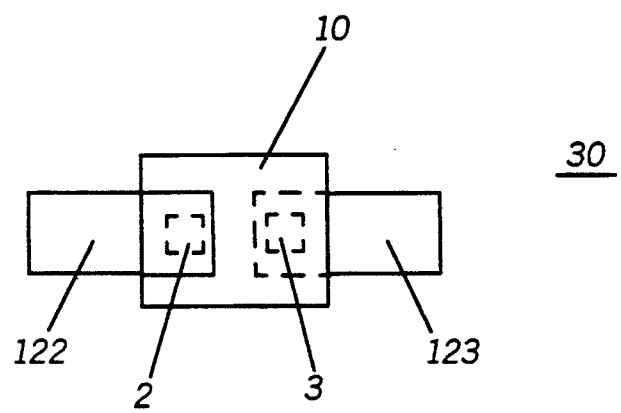
FIG. 2 is a top view of an improved PTC circuit protection device in accordance with the present invention.
Figure 3:
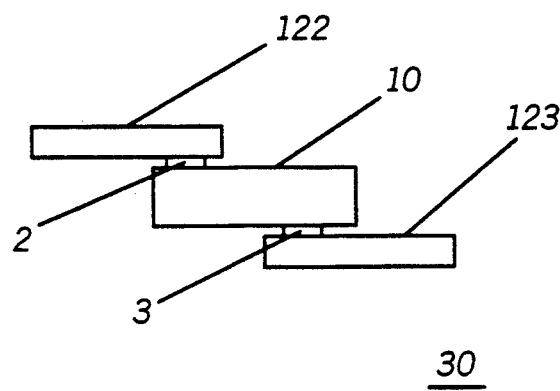
FIG. 3 is a cross-sectional view of the improved PTC circuit protection device of FIG. 2.

Referring to FIGS. 2 and 3, a PTC element 10 of an improved circuit protection device 30 is shown which is contacted by electrodes 2 and 3 on opposing surfaces of the PTC element 10. A lead or tab 122 connects the electrode 2 into a circuit as seen in FIG. 4. The other lead or tab 123, connects the opposing electrode 3 also to the circuit of FIG. 4. Even though the cross-sectional view of the improved PTC circuit protection device 30, as seen in FIG. 3, is drawn enlarged with the improved PTC circuit protection device 30 showing substantial height, the actual height dimension of the device 30 may be substantially planar. In fact, the PTC element 10 of the circuit protection device 30, may be implemented as a laminar Polyswitch ® as manufactured by Raychem and described in their "Strap & Disk Family" data sheet H52948, which is hereby incorporated by reference. According to the invention, at least one of the leads 122 and/or 123 is fabricated from a suitably resistive material such as nichrome, instead of nickel. The leads are positioned and dimensioned (preferably flat) such that the leads 122 and/or 123 have an increased resistance over the nickel leads to achieve a total resistance of about 0.21 or 0.1 ohms, depending on requirements (which is substantially the resistance of nichrome strips in prior art applications). Since the leads 122 and 123 and the PTC element 10 can be made quite thin, the elimination of the nichrome strip 15 of FIG. 1 by the improved circuit protection device 30, with at least one nichrome lead 122 or 123, reduces the parts needed, the size, and the cost of an intrinsically safe battery pack while improving reliability by eliminating an entire part.

Referring to FIG. 4, an intrinsically safe battery circuit 400, having input terminals 32, 34 and output terminals 36, 38, such that circuit 400 is connected between a battery 12 and a load 14, which may be communication device such as a portable two-way radio, a cellular telephone, etc. The battery 12 may comprise interconnecting battery cells 12' and 12", as seen in FIG. 1. It is to be appreciated that the intrinsically safe battery circuit 400 may be implemented anywhere in series with the battery 12, or in between the cells 12' and 12". The battery protection circuit 400 serves to limit the amount of energy supplied to the load such that in the event of a short circuit, sparking or thermal heating is prevented. Additionally, the nichrome lead 122 or 123 of the improved PTC element 10 may also eliminate any additional temperature coupling element that may be conventionally required to temperature "trip" the PTC element 10 as described in U.S. Pat. No. 4,780,598 and hereby incorporated by reference.

In operation, if the desired load 14, such as the two-way radio is connected to the terminals 36 and 38, the battery cells within the battery 12 will supply the necessary current and voltage to the load 14 through the circuit 400 including the serially connected PTC element 10 of the improved circuit protection device 30 with at least one nichrome lead 122 and/or 123. If not both, the non-nichrome lead 122 or 123 may be fabricated from nickel or other suitable material depending on the circuit requirement. Even with the increased resistance of the nichrome lead 122 and/or 123, the improved circuit protection device 30 still has a negligible resistance so that a very small percentage of the total battery voltage will be developed across the device 30. However, should a malfunction occur in the load 14, as for example a short circuit in the radio circuitry, the voltage developed by the battery 12 will cause a short circuit current to flow through the leads 122 and 123, developing a voltage thereacross which will produce enough heat to trip the PTC element 10, limiting the current, or substantially providing an open circuit. With the current path to the terminal 38 open, short circuit current will no longer flow to the shorted load, thus preventing sparks and/or arching which will cause an explosion.

In summary, at least one of the nickel leads of a PTC protection circuit device is/are replaced with the lead fabricated from an increased resistive material such as nichrome. The resistive leads are designed so that they add an additional resistance which replace an additional current limiter of 0.21 ohms, currently implemented as a nichrome strip.

What is claimed is:

1. An improved circuit protection device, comprising:
   a PTC element;
   at least two electrodes connectable to a source of electrical power so that current passes between the electrodes through the PTC element; and
   at least one nichrome electrical lead, in direct physical contact with the PTC element, which electrically connects one of the electrodes to the source of electrical power.

2. An improved intrinsically safe battery, comprising:
   a battery cell;
   a PTC element;
   at least two electrodes connectable to the battery cell so that current passes between the electrodes through the PTC element; and
   at least one nichrome electrical lead, in direct physical contact with the PTC element, which electrically connects one of the electrodes to the battery cell.

3. An improved current limiting safety circuit, comprising:
   a power source;
   an electrical load; and
   a circuit protection device coupled in series with the load and which comprises:
   a PTC element;
   at least two electrodes connectable to the source of electrical power so that current passes between the electrodes through the PTC element; and
   an electric lead, in direct physical contact with the PTC element, which electrically connects one of the electrodes to either the source of electrical power or the electrical load, the electrical lead is made from a resistive material having sufficient resistance to develope a voltage thereacross which will produce enough heat to trip the PTC element, thereby limiting the current in order to replace an additional current limiter.

4. The improved current limiting safety circuit of claim 3 wherein the power source is a battery.

5. The improved current limiting safety circuit of claim 3 wherein the electrical load is a portable radio.

6. The improved current limiting safety circuit of claim 3 wherein the electrical lead is made from a highly resistive material to achieve a total resistance of at least 0.1 ohms.

7. The improved current limiting safety circuit of claim 3 wherein the electrical lead is positioned and dimensioned from a resistive material to achieve a total resistance of at least 0.1 ohms.

8. The improved current limiting safety circuit of claim 3 wherein the electrical load is a communication device.

9. The improved current limiting safety circuit of claim 3 wherein the electrical lead is flat.

10. An improved current limiting safety circuit, comprising:
    a power source;
    an electrical load; and
    a circuit protection device coupled in series with the load and which comprises;
    a PTC element;
    at least two electrodes connectable to the source of electrical power so that current passes between the electrodes through the PTC element; and
    an electric lead, in direct physical contact with the PTC element, which electrically connects one of the electrodes to either the source of electrical power or the electrical load, the electrical lead is made from nichrome.

* * * * *